US007160195B2

(12) United States Patent
Lyon

(10) Patent No.: US 7,160,195 B2
(45) Date of Patent: Jan. 9, 2007

(54) PROPELLER SHAFT ASSEMBLY WITH TUNABLE ENERGY ABSORPTION FEATURE

(75) Inventor: James Alexander Lyon, Northampton (GB)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/967,969

(22) Filed: Oct. 19, 2004

(65) Prior Publication Data
US 2006/0084511 A1    Apr. 20, 2006

(51) Int. Cl.
*F16C 3/00* (2006.01)
(52) U.S. Cl. ............. 464/179; 464/162; 464/182; 464/183
(58) Field of Classification Search ............ 464/162, 464/182, 183; 280/777; 403/359.1, 359.3, 403/359.6
See application file for complete search history.

(56) References Cited

U.S. PATENT DOCUMENTS 5,314,204 A * 5/1994 DuRocher et al. .......... 280/777
5,720,102 A * 2/1998 McClanahan ............ 29/898.12
6,754,943 B1 * 6/2004 Perry et al. ................. 29/421.1

OTHER PUBLICATIONS

PCT Notification of Transmittal of the International Search Report and the Written Opinion of the International Searching Authority, Feb. 13, 2006, 2 pages.
PCT International Search Report by the International Searching Authority of the European Patent Office, Feb. 13, 2006, 3 pages.

* cited by examiner

*Primary Examiner*—Aaron Dunwoody
(74) *Attorney, Agent, or Firm*—Jennifer M. Brumbaugh; Mick A. Nylander

(57) ABSTRACT

A propeller shaft assembly includes an inner member having an outer surface with a plurality of splines defining a splined portion, and an outer member having an inner surface with a plurality of splines defining a splined portion. The splined portion of the inner member is capable of being slidably engaged with the splined portion of the outer member to form a splined connection therebetween. One of the inner and outer members includes a tunable energy absorption feature that controls an amount of interference between the inner and outer members. For example, the tunable energy absorption feature can be in the form of a friction ramp on one member that frictionally engages an angled leading ramp on the other member, a raised portion on one or more splines, or splines having different length that can progressively absorb energy during axial deformation of the propeller shaft assembly.

4 Claims, 7 Drawing Sheets

PROPELLER SHAFT ASSEMBLY WITH TUNABLE ENERGY ABSORPTION FEATURE

FIELD OF THE INVENTION

The invention relates in general to a propeller shaft assembly for a vehicle, and more particularly to a propeller shaft assembly having a energy absorption feature that can be tuned to give the exact level(s) of force required at the moment(s) in time to positively affect the vehicle crash signature.

BACKGROUND OF THE INVENTION

In a rear wheel drive vehicle, for example, a vehicle driveshaft or propeller shaft transmits torque from the transmission through a differential to the rear wheels of the vehicle, thereby causing the vehicle wheels to be desirably and selectively turned. The propeller shaft also dynamically compensates for the change or modification in the distance between the transmission and the differential that may occur when the vehicle is driven. Hence, the propeller shaft includes a portion or a member, which typically and telescopingly moves along the longitudinal axis of the propeller shaft in response to relative movement between the differential and the transmission, thereby allowing the propeller shaft to dynamically modify its length in response to the movement of the vehicle.

This dynamic length modification is typically achieved by the use of a pair of splined members that are normally manufactured of a relatively heavy material, such as conventional and commercially available iron, and which are respectively and commonly referred to as the "slip yoke" and the "yoke shaft." Particularly, the yoke shaft is selectively inserted into the slip yoke and is movably coupled to the transmission. The slip yoke is typically coupled to the differential and the respective splines of these members (which are typically broached or "machined" onto the yoke members) intermeshingly cooperate to allow and/or to cause the yoke shaft to rotate the slip yoke in response to the rotation of the transmission, thereby allowing the transmission produced torque to be selectively coupled to the differential by the rotation of the slip yoke. The intermeshed splines also allow the yoke shaft to be movable along the longitudinal axis of the propeller shaft, thereby allowing the propeller shaft to dynamically compensate for changes in the distance between the transmission and the differential and allowing the propeller shaft to desirably operate when the vehicle is driven.

During a frontal crash, energy is imparted upon the vehicle and deforms the components in a longitudinal manner. Typically, the engine and transmission are driven rearward in a frontal crash, causing the propeller shaft to buckle during such an impact. This buckling of the propeller shaft may cause extensive damage to adjacent underbody components, or may even penetrate the passenger compartment. Thus, it would be desirable to provide a propeller shaft with better energy absorption characteristics and one, which provides improved longitudinal deformation during a crash.

SUMMARY OF THE INVENTION

To solve these and other problems associated with conventional propeller shaft assemblies, the inventor of the present invention has developed a propeller shaft assembly comprising an inner member having an outer surface with a plurality of splines defining a splined portion, and an outer member having an inner surface with a plurality of splines defining a splined portion. The splined portion of the inner member slidably engaged with the splined portion of the outer member forming a splined connection therebetween. One of the inner and outer members includes a tunable energy absorption feature that controls an amount of interference between the inner and outer members.

In another aspect of the invention, a propeller shaft assembly comprises an inner member having an outer surface with a splined portion, and an outer member having an inner surface with a splined portion. The splined portion of the inner member capable of slidably engaging the splined portion of the outer member to form a splined connection therebetween. One of the inner and outer members includes a mechanism that causes interference between the inner and outer members, thereby absorbing energy during axial deformation of the propeller shaft assembly, and wherein the mechanism is capable of selectively adjusting an amount of energy absorbed during axial deformation of the propeller shaft assembly.

DETAILED DESCRIPTION

Figure 1:
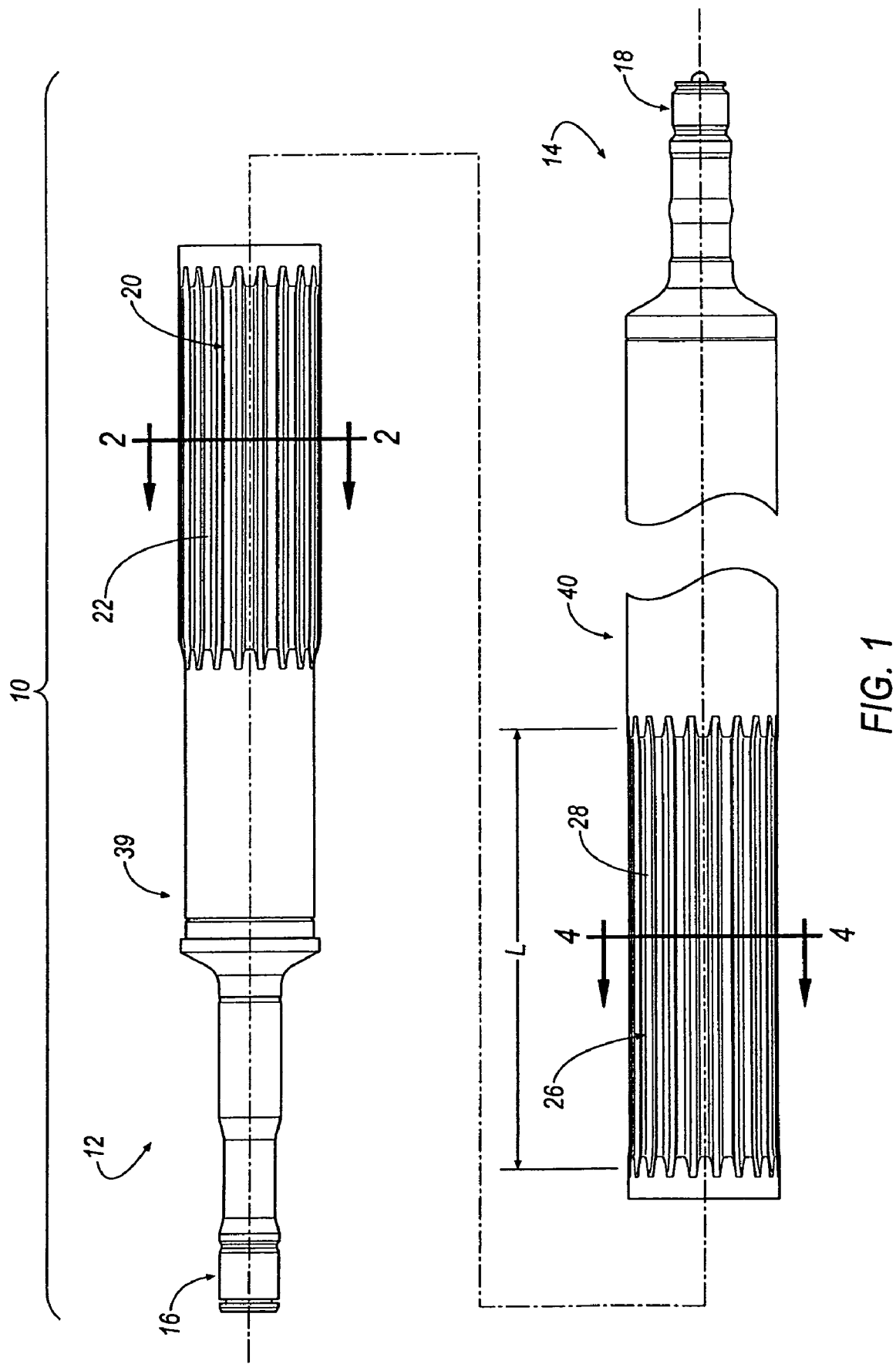
FIG. 1 shows an exploded view of a propeller shaft assembly with tunable energy absorption feature according to an embodiment of the invention.

Referring now to FIG. 1, a propeller shaft assembly 10 is shown according to an embodiment of the invention. In general, the propeller shaft assembly 10 includes a first generally round and/or tubular male or inner member 12, and a second generally round and/or tubular female or outer member 14. A stub shaft 16 can be fixedly attached to a rear end of the inner member 12, and a stub shaft 18 can be fixedly attached to a forward end of the outer member 14. Alternatively, one or both of the stub shafts 16, 18 can be replaced with a conventional flange or yoke. Preferably, the inner and outer members 12, 14 are formed from cylindrical tubes and can be manufactured from any suitable conventional materials, such as commercially available low carbon alloy steel, lightweight aluminum, or the like.

The male or inner member 12 includes a splined portion 20 with a plurality of outwardly projecting splines 22 that are circumferentially formed upon the inner member 12. Similarly, the female or outer member 14 includes a splined portion 26 with a plurality of internally projecting splines 28 that are circumferentially formed upon the outer member 14. In the illustrated embodiment, the exterior surface of the outer member 14 includes indentations in the splined portion 26 to form the splines 28. However, the exterior surface of the outer member 14 may be smooth, and the splines 28 may be formed on an interior surface 30 (see FIG. 2) by broaching the interior surface 30 of the outer member 14.

Referring to FIGS. 2–5, the outwardly projecting splines 22 of the inner member 12 form an outer diameter 23 that is approximately equal to the inner diameter 25 of each member 12, 14 before the internally projecting splines 28 are formed on the outer member 14. The number of splines 22, 28 and depth thereof is application specific to ensure that the propeller shaft assembly 10 is capable of transmitting torque for the particular application. In the illustrated embodiment, there are approximately twenty (20) splines 22, 28 in each member 12, 14 having a depth of approximately 5.0 mm (0.2 inches). The depth is defined as the distance from the cop of an outwardly projecting spline to the base of an adjacent inwardly projecting spline.

Figure 2:
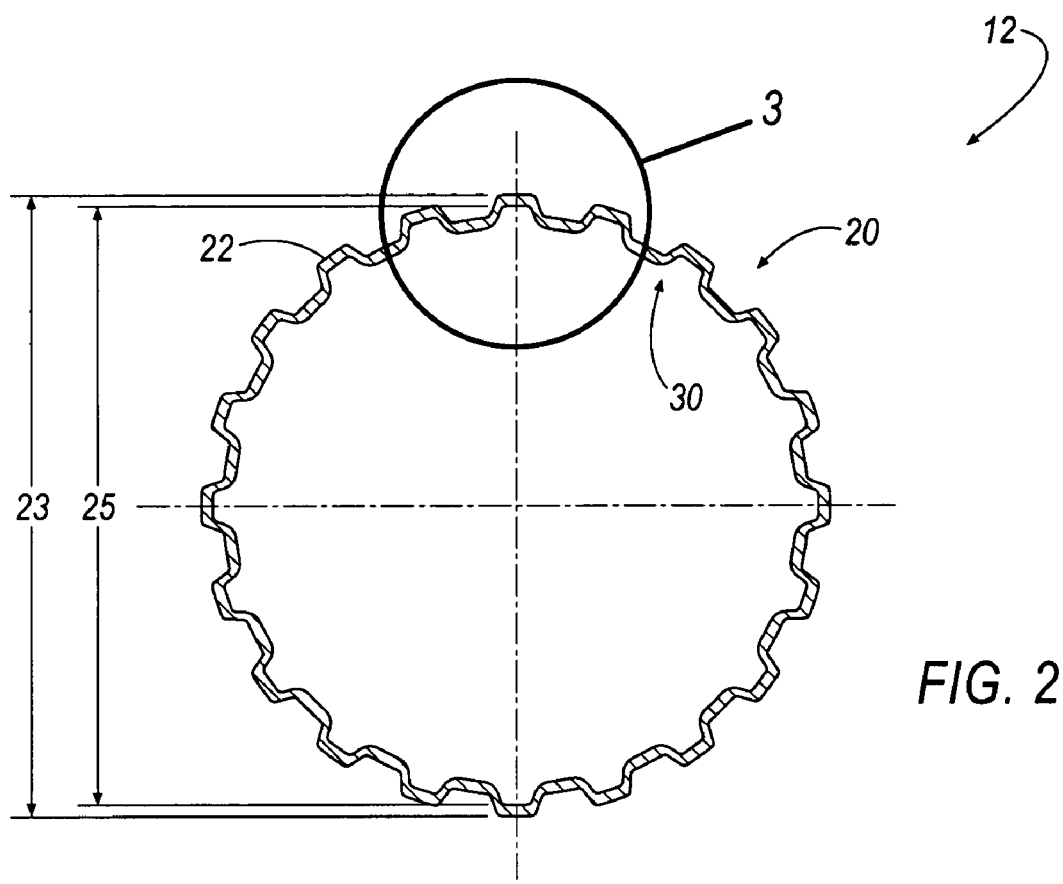
FIG. 2 shows a cross-sectional view of a splined portion of a male or inner member of the propeller shaft assembly of FIG. 1.
Figure 3:
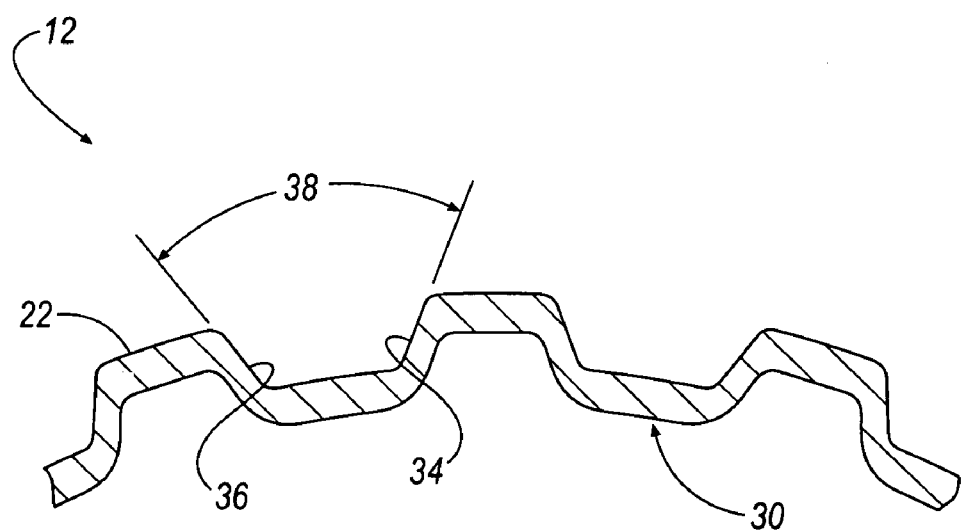
FIG. 3 shows an enlarged view of the splined portion of the inner member of FIG. 2.
Figure 4:
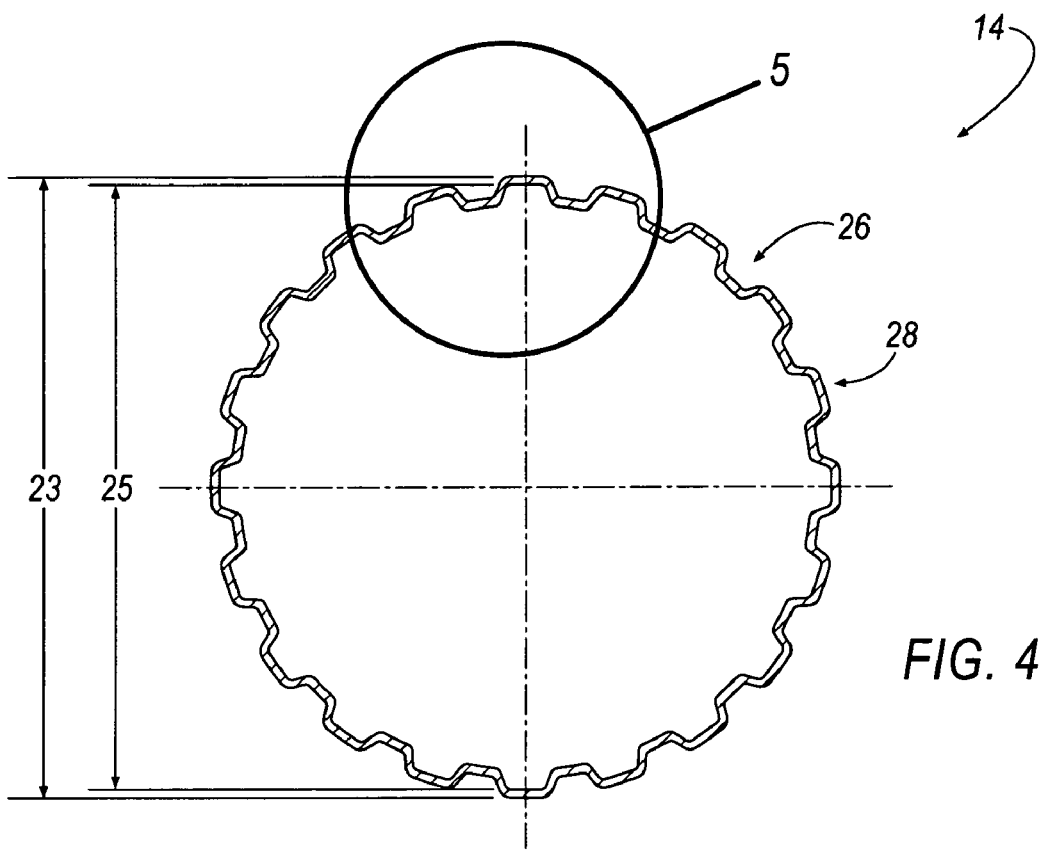
FIG. 4 shows a cross-sectional view of a splined portion of a female or outer member of the propeller shaft assembly of FIG. 1.
Figure 5:
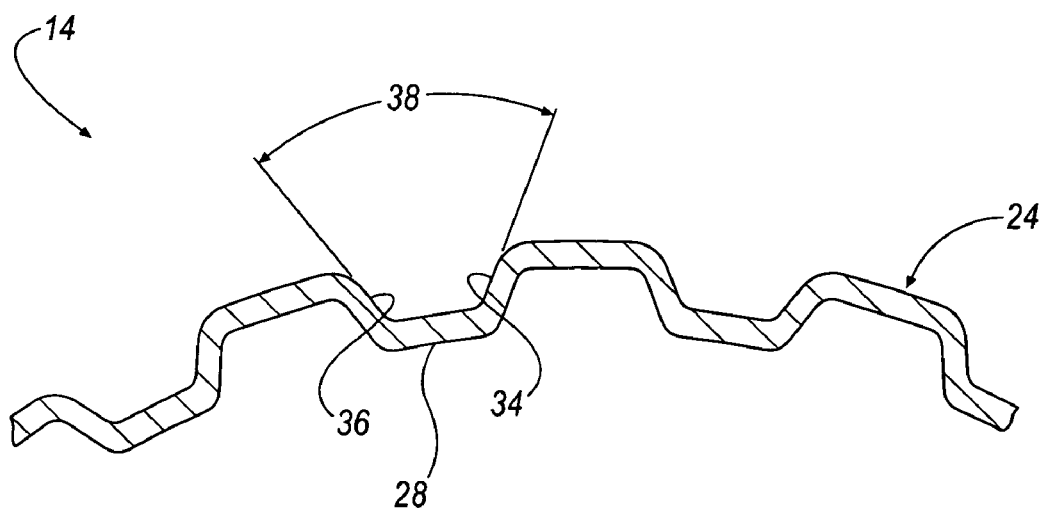
FIG. 5 shows an enlarged view of the splined portion of the outer member of FIG. 4.
Figure 6:
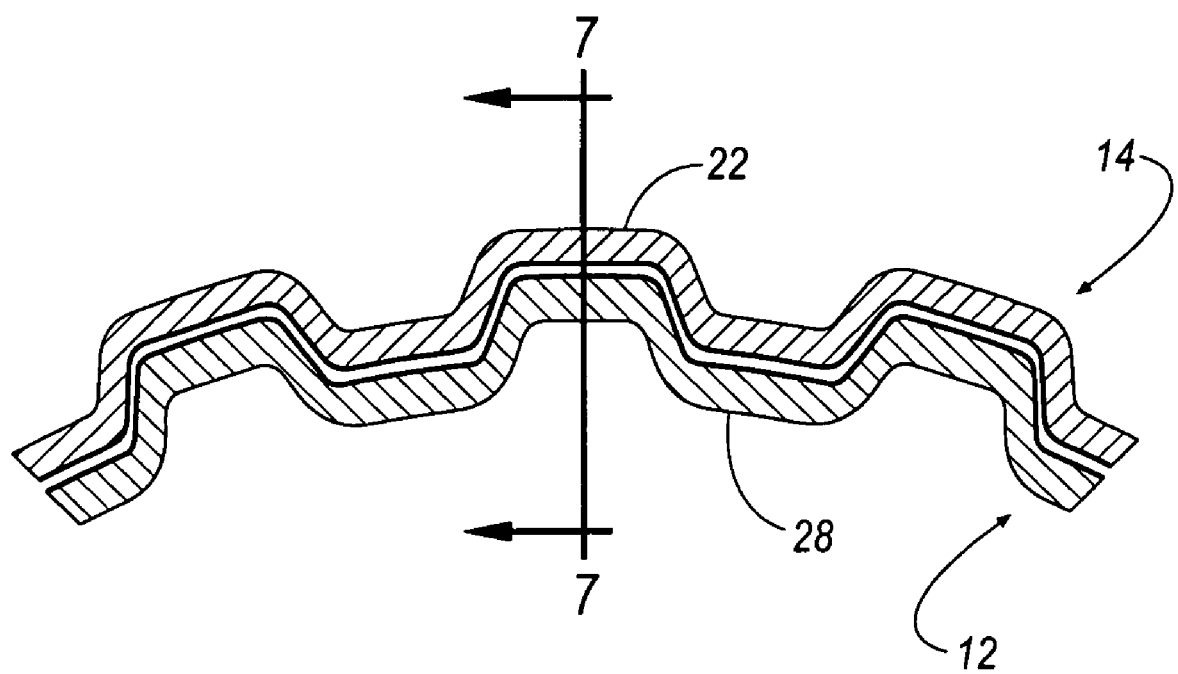
FIG. 6 shows a partial cross-sectional view of a splined connection between the inner and outer members of the propeller shaft assembly of the invention.

In the illustrated embodiment of the invention, the end walls 34, 36 of each spline 22, 28 form an angle 38 of about sixty (60) degrees to each other, although other angular configurations may be utilized. In addition, the internally splined portion 26 of the outer member 14 extends for a first length, L, from the rear end of the outer member 14 (FIG. 1). The splined portion 24 of the male or inner member 12 has an outside, or major diameter 23 at the top of the external splines 22, as shown in FIG. 2. The splined portion 26 of the female or outer member 14 has an inside, or minor diameter 25 at the base of the internal splines 28, as shown in FIG. 4. The male or inner member 12 is capable of being received within the outer member 14 such that the splined portion 26 of the outer member 14 is adapted to selectively and cooperatively intermesh with the externally splined portion 20 of the inner member 12, as shown in FIG. 6.

Referring back now to FIG. 1, the rear end of the inner member 12 includes an unsplined portion 39 that is preferably swaged to reduce the diameter thereof to fit the stub shaft 16. Similarly, the forward end of the outer member 14 includes an unsplined portion 40 that is preferably swaged to reduce the diameter thereof to fit the stub shaft 18. Thus, the rear end of the inner member 12 is reduced to a size for attachment to a conventional differential (not shown) as is well known to one skilled in the art. Likewise, the forward end of the outer member 14 is reduced to a size for attachment to a conventional transmission (not shown) as is well known to one skilled in the art. In this manner, the torque supplied by the transmission is communicated to the outer member 14, then to the inner member 12 by use of the intermeshed splined portions 20, 26, and then to the differential. The male or inner member 12 moves axially with respect to the female or outer member 14 through the splined portions 20, 26 while the vehicle is driven. During a crash with a longitudinal component, the outer member 14 is urged axially rearwardly over the inner member 12.

Figure 9:
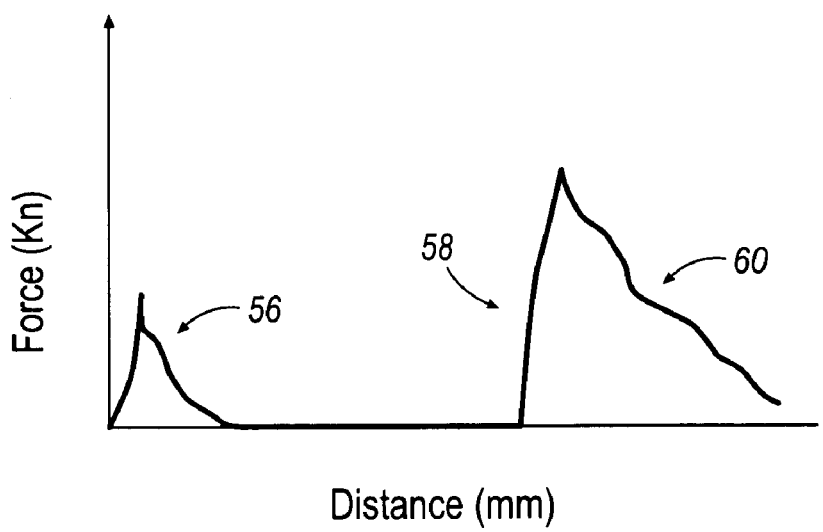
FIG. 9 shows a crash signature curve (force vs. distance) for the propeller shaft assembly during axial deformation without encountering a tunable energy absorption feature according to an embodiment of the invention.

One aspect of the invention is that the splined portions 20, 26 reduces the probability that the propeller shaft assembly 10 will undesirably buckle in a collision. Referring now to FIG. 9, during axial compression of the driveline assembly 10, the inner member 12 moves freely within the splined portion 26 of the outer member 14, as long as the inner member 12 is not forced beyond the splined portion 26, as shown at 56. Preferably, the outer member 14 has splined portion 26 of axial length, L, that is adequate to prevent the inner member 12 from contacting the front end of the outer member 14 during most crashes. However, when the outer member 14 moves rearwardly and the internally splined portion 26 of the outer member 14 is forced beyond the externally spurted portion 20 of the inner member 12, the internally splined portion 26 of the outer member 14 engages the unsplined portion 39 of the inner member 12, resulting in an increase in the absorption of the crash energy, as shown at 58 in FIG. 9. As the outer member 14 is continued to be urged rearwardly, the interference therebetween causes the outer member 14 to plastically deform and expand radially outwardly, otherwise known as buckling. This expansion requires a large amount of energy due to the cold working of the outer member 14 and an increased absorption of the crash energy, designated at 60 in FIG. 9.

Figure 7A:
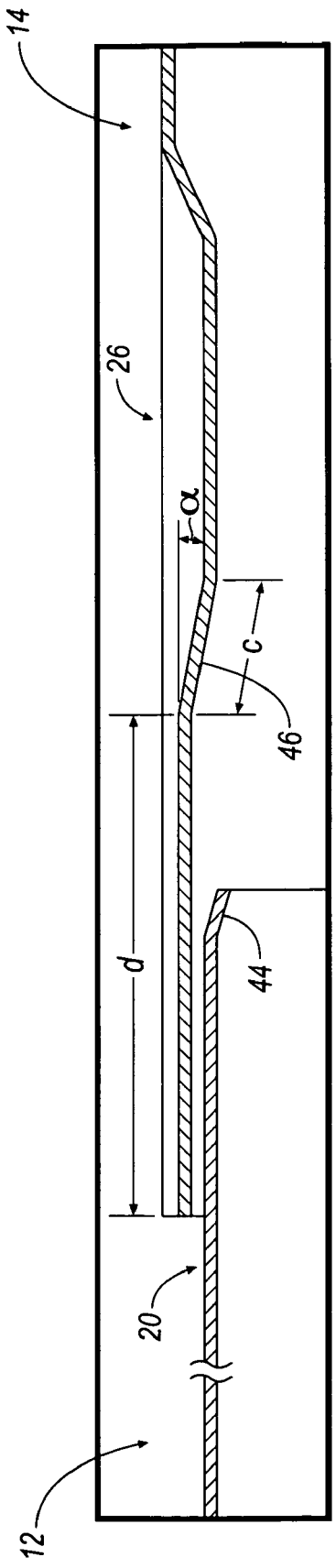
FIG. 7A shows a cross-sectional view of the inner and outer members with a tunable energy absorption feature according to an embodiment of the invention.
Figure 10:
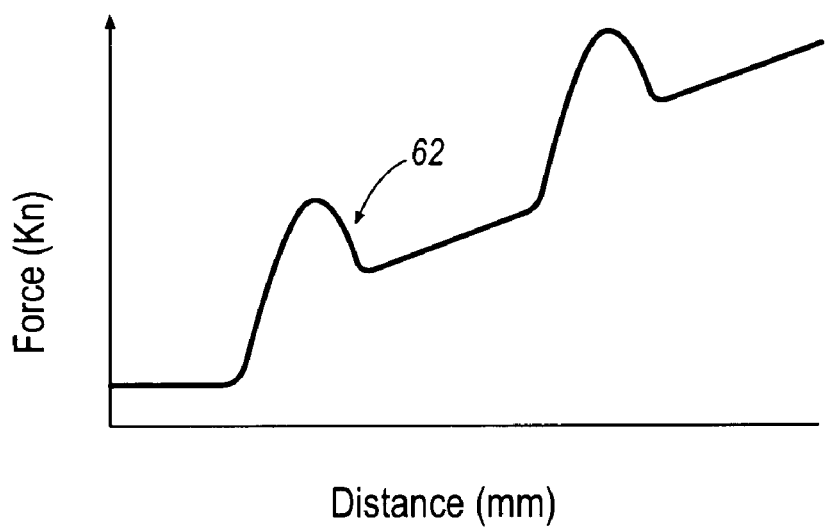
FIG. 10 shows a crash signature curve (force vs. distance) for the propeller shaft assembly during axial deformation with the tunable energy absorption features shown in FIGS. 7A and 7B according to an embodiment of the invention.

In another aspect of the invention, the inner and outer members 12, 14 are designed with a tunable energy absorption feature that provides for a desired crash signature curve (force vs. distance curve) in a collision event. Basically, the principles of this tunable energy absorption feature are accomplished by causing an interference between the inner and outer members 12, 14 in a controlled manner. This interference can be accomplished with a variety of different mechanisms. One such mechanism to cause interference between the inner and outer members 12, 14 is shown in FIG. 7A. In FIG. 7A, the forward end of the male or inner member 12 may include an angled leading ramp 44. In addition, the female or outer member 14 includes a friction ramp 46 having a ramp length, c, and a ramp angle, $\alpha$, with respect to a line parallel to the exterior surface of the outer member 14, that is positioned at a distance, d, from the rear end of the outer member 14. The ramp angle, $\alpha$, of the outer member 14 may be approximately equal to the angle formed by the angled leading ramp 44. Alternatively, the ramp angle, $\alpha$, may be different than the angle formed by the angled leading ramp 44. The ramp length, c, and the ramp angel, $\alpha$, define an inner diameter that is approximately equal to the previously discussed diameter 25. The ramp length, c, the ramp angel, $\alpha$, and the distance, d, define an amount of interference between the inner and outer members 12, 14. As the outer member 14 is urged rearwardly during a collision, the friction ramp 46 of the outer member 14 frictionally engages the angled leading ramp 44 of the inner member 12. As a result of this frictional engagement, energy is absorbed by the propeller shaft assembly 10, as shown at 62 in the crash signature curve shown in FIG. 10. The amount of crash energy can be selectively adjusted by varying the ramp length, c, the distance, d, the ramp angel, α, or a combination thereof, to produce the desired crash signature curve of the propeller shaft assembly 10. For example, increasing the ramp length, c, the distance, d, the ramp angel, α, or any combination thereof, will increase the amount of interference and a corresponding amount of energy absorbed by the propeller shaft assembly 10.

Figure 7B:
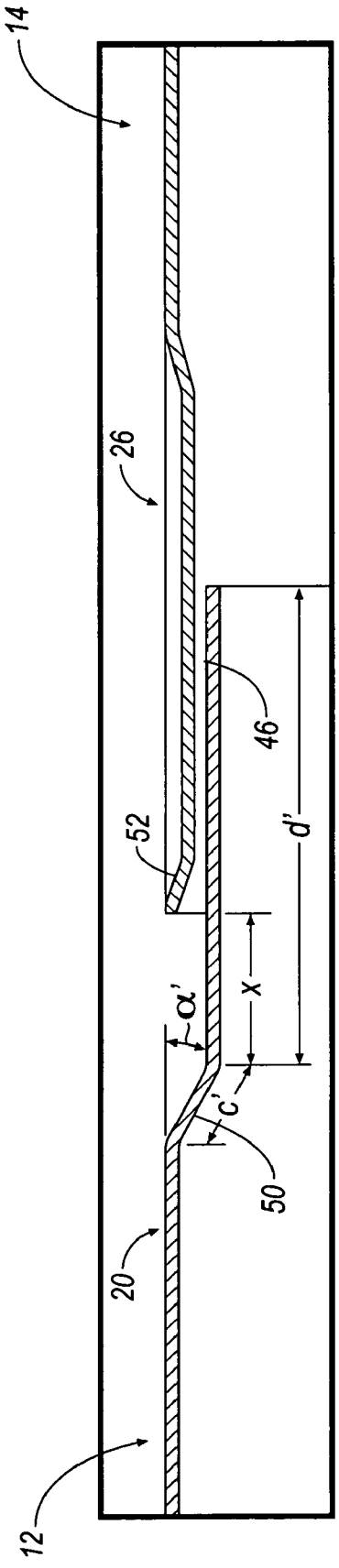
FIG. 7B shows a cross-sectional view of the inner and outer members with a tunable energy absorption feature according to an alternate embodiment of the invention.

Referring now to FIG. 7B, an alternate mechanism to cause interference between the inner and outer members 12, 14, the forward end of the male or inner member 12 includes a friction ramp 50 having a length, c', and a ramp angle, a', with respect to a line parallel to the exterior surface of the inner member 12, and positioned at a distance, d', from the forward end of the inner member 12. The ramp length, c', and the ramp angle, α', define an inner diameter that is approximately equal to the previously discussed diameter 25, and defines an amount of interference between the inner and outer members 12, 14. The outer member 14 includes an angled leading ramp 52. The ramp angle, α', of the inner member 12 may be approximately equal to the angle formed by the angled leading ramp 52 of the outer member 14. Alternatively, the ramp angle, α', may be different than the angle formed by the angled leading ramp 52. As the outer member 14 is urged rearwardly during a collision, the angled leading ramp 52 of the outer member 14 travels a distance, x, and then frictionally engages the friction ramp 50 of the inner member 12 by an amount of interference, i. As a result of this frictional engagement, the amount of interference and a corresponding amount of energy is absorbed by the propeller shaft assembly 10, resulting in the crash signature curve that is similar to the crash signature curve shown at 62 in FIG. 10. Similar to the mechanism shown in FIG. 7A, the amount of crash energy of the mechanism shown in FIG. 7B can be selectively adjusted by varying the ramp length, c', the distance, d', the ramp angel, α', or a combination thereof, to produce the desired crash signature curve of the propeller shaft assembly 10. For example, increasing the ramp length, c', the distance, d', the ramp angle, α', or any combination thereof, will cause an increase in the amount of interference and the energy absorbed by the propeller shaft assembly 10.

As can be realized from the above embodiments, it will be appreciated that the invention is not limited by which member includes the friction ramp and which member includes the angled leading ramp.

Figure 7C:
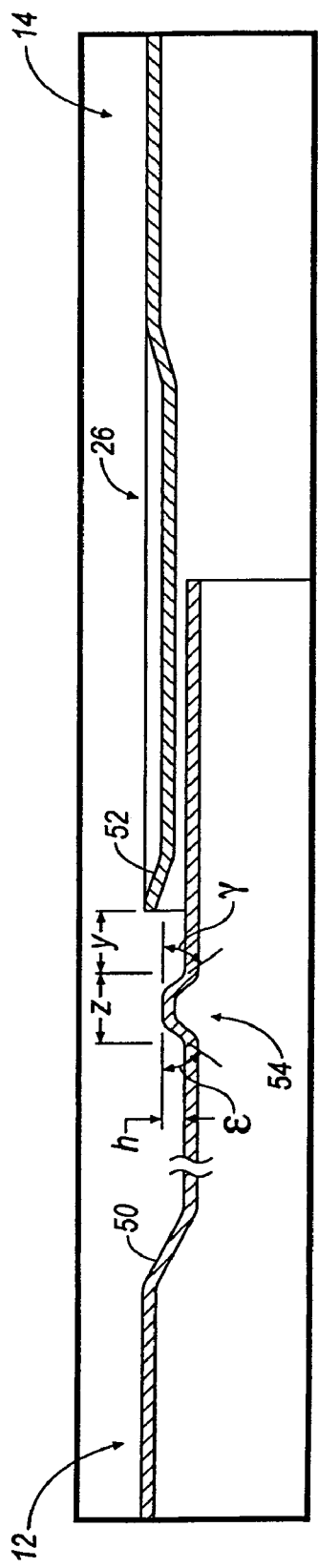
FIG. 7C shows a cross-sectional view of the inner and outer members with a tunable energy absorption feature according to yet another alternate embodiment of the invention.
Figure 11:
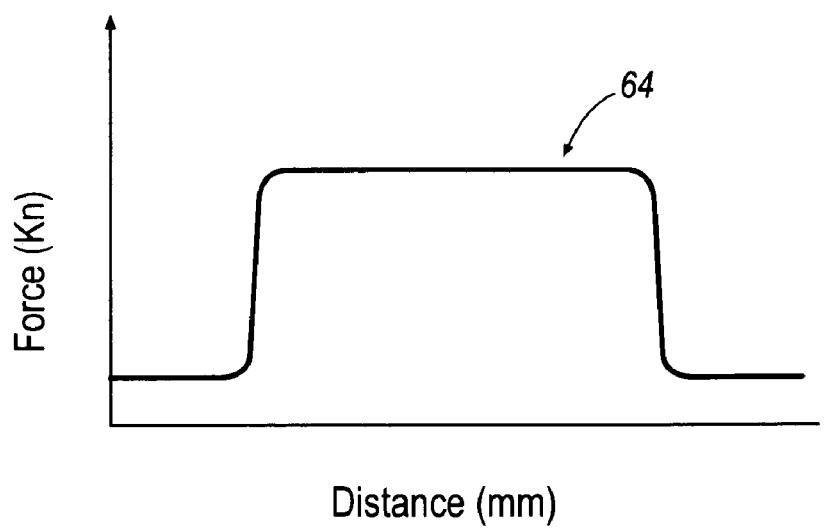
FIG. 11 shows a crash signature curve (force vs. distance) for the propeller shaft assembly during axial deformation with a tunable energy absorption feature shown in FIG. 7C according to an embodiment of the invention.

Referring now to FIG. 7C, another alternate mechanism to cause interference between the inner and outer members 12, 14 is shown. The inner and outer members 12, 14 are similar to the mechanism shown in FIG. 7B, except one or more splines 22 of the inner member 12 includes a bump or raised portion, indicated generally at 54. As can be appreciated, the raised portion 54 may alternately be disposed on the splines 28 of the outer member 14. The raised portion 54 is defined by a height, h, a length, z, an approach angle, γ, and a taper angle, ε. As the outer member 14 is urged rearwardly during a collision, the angled leading ramp 52 of the outer member 14 travels a distance, y, and frictionally engages the raised portion 54 of the inner member 12 by an amount of interference. As a result of this frictional engagement due to the amount of interference, energy is absorbed by the propeller shaft assembly 10 in the crash signature curve shown at 64 in FIG. 11. The amount of interference can be selectively adjusted by varying the height, h, the length, z, the approach angle, γ, or the taper angle, ε, or a combination thereof, to produce the desired crash signature curve of the propeller shaft assembly 10, as shown in FIG. 11. As the outer member 14 continues to be urged rearwardly during a collision, the angled leading ramp 52 of the outer member 14 frictionally engages the friction ramp 50 of the inner member 12 by an amount of interference similar to the mechanism described above and shown in FIG. 7A.

It will be appreciated that the invention is not limited by the number of raised portions 54 nor the location of the raised portions 54, and that the invention can be practiced by any desired number and location of raised portions 54 that will produce the desired amount of interference and resulting crash signature curve. For example, the raised portions 54 can be formed in a staggered arrangement wherein the raised portions 54 are formed in every other spline 22, or a plurality of raised portions 54 can be formed in each spline 22, or a combination thereof. In another example, the raised portion 54 can be located between the splines 22 in a staggered arrangement. Further, as discussed, the raised portions 54 may also be disposed upon the splines 28 of the outer member 14 either alone or in conjunction with the raised portions 54 located on the splines 22 of the inner member 12.

Figure 8:
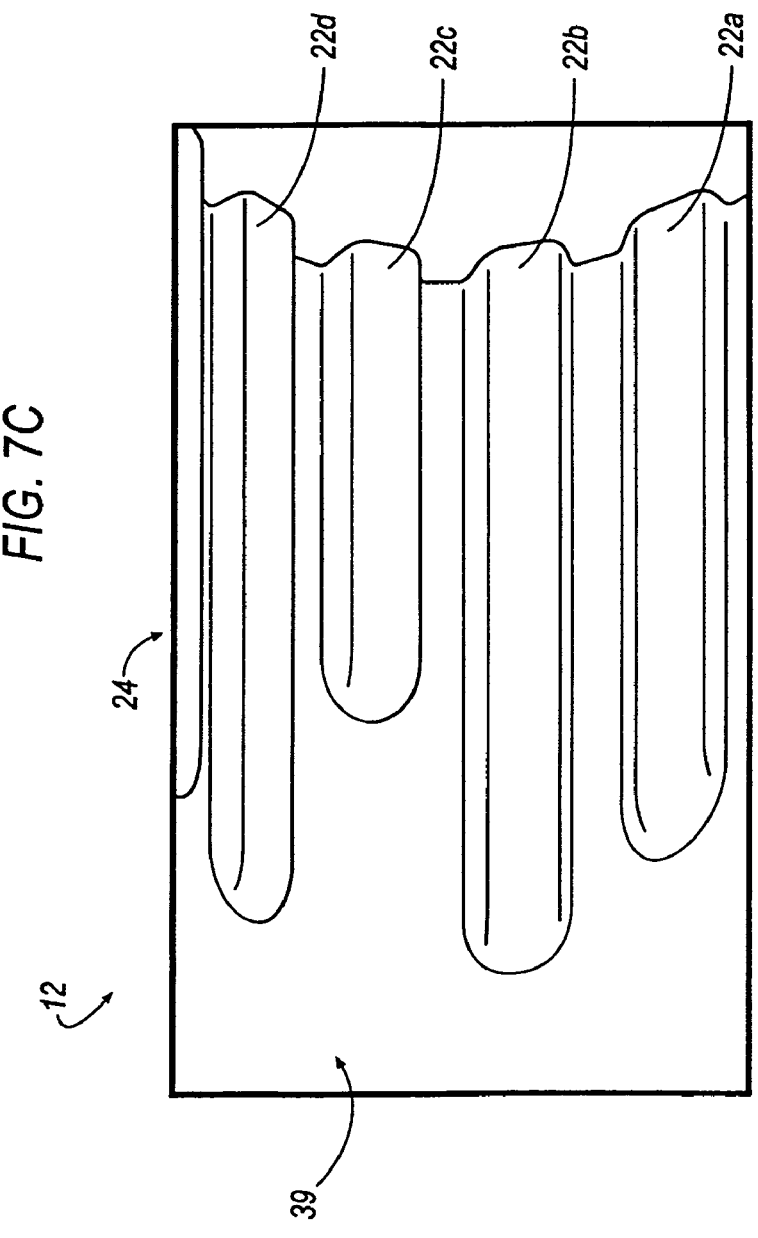
FIG. 8 shows a perspective view from the inside of the inner member with a tunable energy absorption feature according to still yet another alternate embodiment of the invention.

The principles of the invention can be practiced by the use of any type of mechanism that will cause a desired amount of interference in the splined portions 22, 26 of the inner and outer members 12, 14. For example, one such type of mechanism is shown in FIG. 8 in which the length of the splines 22 of the male or inner member 12 is varied to selectively and progressively increase an amount of energy absorbed by the propeller shaft assembly 10 during a collision event. This variation of the length of the splines 22 can be accomplished in many different ways. For example, every other spline 22 can be approximately equal in length, while the remaining splines 22 vary in length. In the illustrated embodiment, four splines 22a, 22b, 22c, 22d are shown in which the length of splines 22b and 22d are approximately equal, while the length of spline 22a is shorter than the length of spline 22c. As the outer member 14 is urged rearwardly during a collision, the outer member 14 will move freely within the splined portion 24 of the inner member 12 until the outer member 14 reaches the unsplined portion 39 'of the inner member 12, which produces an amount of interference. As a result of this frictional engagement due to the amount of interference energy is absorbed by the propeller shaft assembly 10, resulting in a particular crash signature curve. The amount of interference can be selectively adjusted by varying the length of the splines 22 to produce the desired crash signature curve of the propeller shaft assembly 10. Thus, by varying the length of the splines 22 of the inner member 12, a desired amount of interference is produced, resulting in a desired crash signature curve for the propeller shaft assembly 10.

Because the propeller shaft assembly 10 is thereby permitted to collapse axially and does not buckle significantly (i.e., collapse radially), the vehicle may be in a condition to permit towing or driving of a damaged vehicle which would have otherwise required a trailer to transport the vehicle to a repair facility. More significantly, because the propeller shaft assembly 10 does not buckle, adjacent components remain undamaged after a crash and therefore the damage to the vehicle is reduced.

While the invention has been specifically described in connection with certain specific embodiments thereof, it is to be understood that this is by way of illustration and not of limitation, and the scope of the appended claims should be construed as broadly as the prior art will permit.

What is claimed is:

1. A propeller shaft assembly, comprising:
an inner member having an outer surface with a splined portion;

an outer member having an inner surface with a splined portion, said splined portion of the inner member capable of slidably engaging the splined portion of the outer member to form a splined connection therebetween;

wherein one of the inner and outer members includes a raised portion located on one or more splines of the splined portion of one of the inner and outer members, the raised portion defining a height, a length, an approach angle, and a taper angle, and wherein one of the inner and outer members travels a predetermined distance before causing interference between the inner and outer members, thereby absorbing energy during axial deformation of the propeller shaft assembly.

2. A propeller shaft assembly as in claim 1, wherein the amount of energy absorbed during axial deformation of the propeller shaft assembly can be selectively adjusted by varying the height, the length, the approach angle, or the taper angle, or any combination thereof.

3. A propeller shaft assembly as in claim 1, further comprising a friction ramp positioned at a distance from one end of one of the inner and outer members.

4. A propeller shaft assembly as in claim 3, further comprising an angled leading ramp located on the other one of the inner and outer members.

* * * * *